United States Patent Office 3,845,062
Patented Oct. 29, 1974

---

3,845,062
4-HYDROXY-PIPERIDINE DERIVATIVES AND THEIR PREPARATION
Hans Henecka and Hans Werner Schubert, Wuppertal-Elberfeld, Germany, assignors to Farbenfabriken Bayer AG
No Drawing. Continuation of application Ser. No. 529,642, Feb. 24, 1966. This application July 14, 1969, Ser. No. 850,298
Claims priority, application Germany, Feb. 27, 1965, F 45,378
Int. Cl. C07d 29/16
U.S. Cl. 260—293.83          22 Claims

ABSTRACT OF THE DISCLOSURE

New 4-hydroxypiperidine derivatives are provided which are important intermediates for morphine-like analgesics obtained for example by N-methylating 2-p-methoxybenzyl-3,4-dimethyl - 4 - hydroxypiperidine followed by treatment with hydrobromic acid to form 2,5,9-trimethyl-2'-hydroxy-6,7-benzomorphan. The 4-hydroxypiperidine derivatives have the formula:

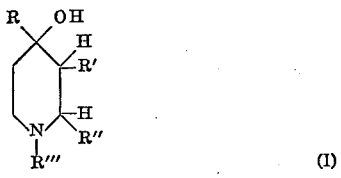

in which R is an alkyl, aryl or aralkyl radical, R' is hydrogen, a primary-linked alkyl or aralkyl radical or an aryl radical, R'' is hydrogen, an alkyl, aralkyl or aryl radical and R''' is hydrogen, an alkyl or aralkyl radical, and the radicals R, R', R'' and R''' may, according to choice, be the same or different, can be obtained by partially hydrogenating β,γ-unsaturated nitriles of the formula:

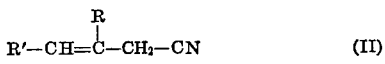

to γ,δ-unsaturated amines of the formula:

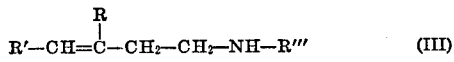

and the amines (III) so obtained are condensed in acidic solution with aldehydes R'''.CHO, wherein R, R', R'' and R''' have the above meanings.

The 4-hydroxypiperidine derivatives are prepared by reducing a β,γ-unsaturated nitrile to a γ,δ-unsaturated amine by catalytically activated hydrogen in a solvent at about ambient temperature and condensing the obtained amine in acidic solution with an aldehyde.

---

This is a continuation of application Ser. No. 529,642, filed Feb. 24, 1966.

The present invention relates to novel derivatives of 4-hydroxy-piperidine which are useful as intermediates for morphine-like active analgesics and other therapeutically active substances and procedure for producing the same.

It has been found that derivatives of 4-hydroxy-piperidine of the formula:

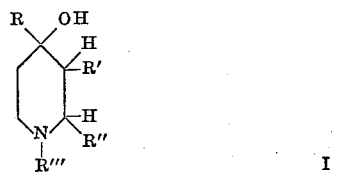

in which R is an alkyl, aryl or aralkyl radical, R' is hydrogen, a primary-linked alkyl or aralkyl radical or an aryl radical, R'' is hydrogen, an alkyl, aralkyl or aryl radical and R''' is hydrogen, an alkyl or aralkyl radical, and the radicals R, R', R'' and R''' may, according to choice, be the same or different, can be obtained by partially hydrogenating β,γ-unsaturated nitriles of the formula:

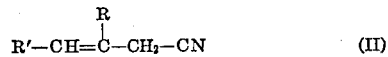

to γ,δ-unsaturated amines of the formula:

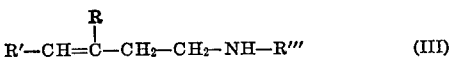

and the amines (III) so obtained are condensed in acidic solution with aldehyde R'''.CHO, wherein R, R', R'' and R''' have the above meanings.

A condensation reaction of this type was hitherto only known as a special case of the *Pictet-Spengler* synthesis of tetrahydro-isoquinolines, which consists in the condensation of β-phenyl-ethylamines with aldehydes, i.e. the condensation of tetrahydrophenyl-ethylamine (cyclohexenyl-ethylamine) with aldehydes to 10-hydroxy-decahydro-isoquinolines [Annalen, *581*, 85; *583*, 110 (1953)]. The fact that this known variant of the *Pictet-Spengler* synthesis can also be generally applied to open-chain γ,δ-unsaturated amines and thus represents only a special case of a synthesis now recognized as being generally applicable, was hitherto unknown.

As starting materials for the process according to the invention, there are used β,γ-unsaturated nitriles of the formula (II), such as are obtained, for example, by the condensation of ketones of the general constitution R'.CH$_2$.CO.R with cyanoacetic acid in admixture with the isomeric α,β-unsaturated nitriles (IV).

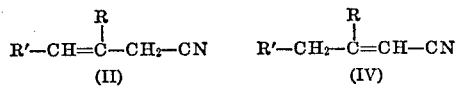

R and R' have the above meanings.

If R is alkyl or aralkyl a second β,γ-unsaturated form can occur.

The composition of these nitrile mixtures depends upon the substituents R and R'.

The α,β- and β,γ-unsaturated nitriles can also be obtained by other known methods, such as by substitution of the halogen in corresponding ω-halo-olefines by the cyano group.

It is, however, not necessary to separate the β,γ-unsaturated nitriles required as starting material according to the invention from such an equilibrium mixture of the α,β-and β,γ-unsaturated nitriles since, as has been found, only the former can be partially hydrogenated catalytically to γ,δ-unsaturated amines (III); from the admixed α,β-unsaturated nitriles there result by the hydrogenation practically only saturated amines which do not interfere with the course of the further reaction.

The first step of the synthesis according to the invention consists in the partial reduction of the β,γ-unsaturated nitriles to γ,δ-unsaturated amines. This reduction is preferably carried out with catalytically activated hydrogen in alcoholic solution with the use of Raney catalysts, especially Raney nickel or Raney cobalt. Since only the cyano group is to be partially hydrogenated, with the maintenance of the double bond, it is expedient to work at room temperature or at an only slightly increased temperature, e.g. at 50–70° C. The more detailed conditions of the hydrogenation depend essentially on the activity of the catalyst, but the object according to the invention is best achieved with catalysts of average activity. It is, therefore, recommended partially to de-activate highly active catalysts by the usual methods, e.g. by the additional of ferrous sulphate. Suitable solvents are lower alcohols, such as methanol or ethanol; with equally good results, however, hydrocarbons can also be used such as benzene, toluene or cyclohexane, or ethers such as tetrahydrofuran or dioxane, and the like. If the preparation of primary amines is intended, then it is also expedient to work with the usual additives, such as ammonia, ammonium acetate, or potassium hydroxide, to avoid the formation of secondary amines.

Instead of the catalytic hydrogenation of the nitriles (II) (or II+IV) to the amines (III), any other known method of reduction may be used, which is equivalent to catalytic hydrogenation, such as reduction with nascent hydrogen, with sodium and alcohol, or the reduction with alkali metal or alkaline earth metal alanates or borohydrides in the solvents or diluents usual for this purpose. The $\beta,\gamma$-unsaturated amines resulting from the admixed $\alpha,\beta$-unsaturated nitriles, besides the saturated amines, do not interfere with the further course of the reaction.

The composition of the amine mixtures does not always correspond to the composition of the nitrile mixtures used as starting material since, during the reduction, a displacement can take place by the influence of the reducing agent (e.g. lithium alanate).

Instead of the primary amines (III, R'''=H), the corresponding secondary amines (III, R'''=alkyl or aralkyl, such as methyl, ethyl, cyclopropylmethyl, allyl, substituted allyl, benzyl, $\beta$-phenylethyl, $\gamma$-phenyl-$\gamma$-ketopropyl, $\gamma$-phenyl-$\gamma$-hydroxypropyl and the like) can also be used for the further reaction according to the invention. These secondary amines (III) are obtained by the usual methods either directly from the nitriles (II) (or II+IV), e.g. by hydrogenation in the presence of primary amines R'''.NH$_2$ or by alkylation of the primary amines (III, R'''=H) initially obtained from the nitriles according to the invention.

The last step of the new synthesis according to the invention, the condensation of the amines (III) with aldehydes R''.CHO to the 4-hydroxy-piperidine derivatives (I), is carried out in acidic aqueous solution at pH 2–4. The experimental conditions of this condensation can vary within wide limits; it is possible to work in a concentrated, about 10–30%, solution or, as has generally proved to be advantageous, in an about 0.1–0.2 molar solution, corresponding to a concentration of amine of about 1–5%.

Normally the waterbath temperature is chosen as the reaction temperature, i.e. about 80–90° C.; with especially reactive aldehydes, such as formaldehyde, the condensation according to the invention can also be carried out at room temperature or at an only slightly increased temperature, e.g. at 30–50° C.

The aldehydes employed for the condensation are, in general, used in the free form. Alternatively, however, there can also be used as aldehyde equivalents those compounds which, under the reaction conditions, are gradually converted into the free aldehydes capable of condensation, such as para-formaldehyde as a source for formaldehyde; paraldehyde for acetaldehyde; or phenylglycide esters for phenylacetaldehyde; instead of the free aldehydes, their bisulphite compounds can also be used.

The duration of the reaction depends upon the condensation ability of the aldehydes used or the speed with which the aldehydes are liberated from the equivalent forms used. If working at 80–90° C., then a complete reaction is already achieved with reactive aldehydes after heating for about 1 hour, but generally after heating for about 12–24 hours, whereas with aldehyde equivalent forms which slowly split off or with sterically hindered aldehydes, a prolonged heating e.g. for 2–6 days, may be necessary. When reactive formaldehyde is used, the condensation also takes place by standing for several weeks at room temperature.

As to the relative amount of aldehyde used, the condensation of primary $\gamma,\delta$-unsaturated amines is carried out with the application of the calculated molar amount. If, however, working with formaldehyde, and it is intended to convert the 4-hydroxy-piperidine derivative formed according to the invention into the corresponding N-methyl compound, then formaldehyde can also be used in excess since the N-methylol-4-hydroxy-piperidine derivative which is now formed can easily be reduced to the N-methyl compound.

The maintenance of the pH optimum of pH 2–4 is important for attaining maximum yields of 4-hydroxy-piperidines. If a greater excess of acid is used (pH~1), then an undesirable dehydration of the 4-hydroxy-piperidines to $\Delta^{3,4}$-piperidines may take place.

If the starting materials are susbtituted by aryl radicals, then these radicals can additionally contain substituents such as lower alkyl groups, halogen, alkoxy, hydroxy or substituted amino groups; the aryl radicals, moreover, can not only be phenyl, naphthyl and the like, but also heteroaryl such as pyridyl, thiazolyl and the like. Alkyl substituents of the starting materials can be straight chain or branched, saturated or unsaturated.

The derivatives of 4-hydroxy-piperidine obtained according to the invention are important intermediate products for the synthesis of pharmacodynamic, highly active substances, such as morphine-like active analgesics, for example.

Thus, the 2-p-methoxybenzyl-3,4-dimethyl-4-hydroxy-piperidine of Example 1 after being N-methylated can be converted into 2,5,9 - trimethyl-2'-hydroxy-6,7-benzomorphane by boiling with constant boiling hydrobromic acid.

Alternatively, the N-3-dimethyl-4-p-phenyl-4-hydroxy-piperidine of Example 9 can be converted into the corresponding 4-propionyloxy derivative by treating with propionic acid anhydride and pyridine. This derivation is known to have morphine-like analgetic properties.

Other conversions of our intermediates into compounds with pharmacodynamic properties will be apparent to those skilled in the art.

The invention is illustrated by the following non-limitative examples.

EXAMPLE 1

2-p-methoxybenzyl-3,4-dimethyl-4-hydroxy-piperidine (a) 285 g. (3 mol) of a mixture of 3-methyl-$\Delta^{2,3}$-pentenonitrile and 3-methyl-$\Delta^{3,4}$-pentenonitrile (obtained by the condensation of methyl ethyl ketone with cyanoacetic acid; b.p. 156–157° C.) are dissolved in 1 litre of methanol and, after the addition of 30 g. of Raney cobalt and 30 ml. of a 0.1 molar aqueous ferrous sulphate solution, hydrogenated at 50–70° C. and at a pressure of 50 atmospheres of hydrogen until termination of the hydrogen absorption, i.e. 139 litres of hydrogen within 1 hour. After cooling, the catalyst is separated, the solution acidified, while cooling, with 300 ml. of concentrated hydrochloric acid and the methanol evaporated from this solution in a vacuum at 50° C. The base is liberated, with strong cooling, from the aqueous solution obtained, by means of a concentrated sodium hydroxide solution, the base is taken up with ether, the ether solution dried over potassium hydroxide and, after evaporation of the ether, the base is distilled: b.p. 125–128° C.; yield 180 g. (60% of theory).

This reduction can also be carried out with lithium alanate:

A solution of 142.5 g. (1.5 mol) of a mixture of 3-methyl-$\Delta^{2,3}$-pentenonitrile and 3-methyl-$\Delta^{3,4}$-pentenonitrile (see above) in 100 ml. of anhydrous ether is added dropwise, with stirring, at −10 to −5° C. to 68.5 g. (1.8 mol) of lithium alanate in 500 ml. of anhydrous ether. The reaction mixture is allowed to warm up slowly to room temperature, stirred at room temperature for a further 12 hours and thereafter decomposed by the dropwise addition of a 20% sodium hydroxide solution. The ether layer is separated, the resultant base shaken out with 5% hydrochloric acid, the base liberated from the clear acidic solution with a concentrated sodium hydroxide solution and isolated with ether in the usual way: b.p. 130–132° C.

(b) 50 g. (0.5 mol) of the so obtained primary amine (mixture of 3-methyl-pentylamine and 3-methyl-$\Delta^{3,4}$-pentenylamine) are dissolved in 535 ml. of 1N hydrochloric acid, the solution diluted with 1965 ml. of water (pH≈3) and, after the addition of 104 g. (0.5 mol) of p-methoxyphenyl-glycidic acid methyl ester, heated at 80–90° C. for 2–3 days, with vigorous stirring. After cooling, resin-like impurities are filtered off, the solution is covered with a small amount of ether and the resultant base separated by the addition of a 50% potassium carbonate solution. After standing for several hours, the condensation product has separated in crystalline form at the separating layer. The product is filtered off with suction and washed with water and a little ice cold ether. In this manner, there are obtained 26.5 g. of 2-p-methoxybenzyl-3,4-dimethyl-4-hydroxy-piperidine of m.p. 140–141° C.

$C_{15}H_{23}NO_3$ (249)
Calc.: C 72.27, H 9.30, N 5.62, $OCH_3$ 12.45
Found: C 72.22, H 9.52, N 5.45, $OCH_3$ 12.59

From the ethereal mother liquor of the first crystallization there is obtained, after distillation of the residue obtained by evaporation of the ether (b.p. 160–165° C./0.01 mm. Hg), a rapidly solidifying oil; from ether, 3.5 g., m.p. 134–136° C., which is presumably a stereomer of the form first obtained.

$C_{15}H_{23}NO_3$ (249)
Calc.: C 72.27, H 9.30, N 5.62
Found: C 72.50, H 9.25, N 5.69

Total yield 30 g.; since the starting amine only contained about 50% 3-methyl-$\Delta^{3,4}$-pentenylamine, the yield amounts to about 50% of theory.

If the p-methoxyphenylglycide methyl ester is replaced by the equimolar amount of benzaldehyde and the procedure is otherwise the same as that described under (b), then there is obtained 2-phenyl-3,4-dimethyl-4-hydroxy-piperidine of m.p. 165–167° C.

$C_{13}H_{19}NO$ (205)
Calc.: C 76.04, H 9.33, N 6.82
Found: C 76.18, H 9.22, N 6.90

By replacing the benzaldehyde by the equimolar amount of freshly distilled isobutyraldehyde, there is obtained, analogously, 2-isopropyl-3,4-dimethyl-4-hydroxy-piperidine of m.p. 118–120° C.

$C_{10}H_{21}NO$ (171)
Calc.: C 70.11, H 12.36, N 8.18
Found: C 70.10, H 11.88, N 8.23

By replacing the p-methoxyphenylglycidic acid methyl ester with equimolar amounts of various aldehydes and proceeding in the remaining way as described under (b), there are obtained, for example, the following compounds:

| Aldehyde | Reaction product | |
|---|---|---|
| Isobutyraldehyde | 2-isopropyl-3,4-dimethyl-4-hydroxypiperidine. | M.P. 118–120° C. |
| Benzaldehyde | 2-phenyl-3,4-dimethyl-4-hydroxypiperidine. | M.P. 165–167° C. |
| 4-methoxybenzaldehyde. | 2-p-methoxyphenyl-3,4-dimethyl-4-hydroxypiperidine. | M.P. 144–146° C. |
| 3-chlorbenzaldehyde | 2-m-chlorphenyl-3,4-dimethyl-4-hydroxy-piperidine. | M.P. 150–153° C. |
|  | 2-m-chlorphenyl-3,4-dimethyl-4-hydroxy-piperidine (stereoisomeric form). | M.P. 137°–139 C. |
|  | 2-m-chlorphenyl-3,4-dimethyl-4-hydroxy-piperidine (isomeric mixture). | $Kp._{0.15}$ 138–141° C. |
| 3,4-dimethoxybenz-aldehyde. | 2-(3′,4′-dimethoxyphenyl)-3,4-dimethyl-4-hydroxypiperidine. | M.P. 132–135° C. |
| 2-nitrobenzaldehyde | 2-o-nitrophenyl-3,4-dimethyl-4-hydroxy-piperidine. | M.P. 203–205° C. |
| 4-nitrobenzaldehyde | 2-p-nitrophenyl-3,4-dimethyl-4-hydroxy-piperidine. | M.P. 168–171° C. |
| Pyridine-2-aldehyde | 2-(2′-pyridyl)-3,4-dimethyl-4-hydroxypiperidine. | M.P. 108–111° C. |
| Pyridine-4-aldehyde | 2-(4′-pyridyl)-3,4-dimethyl-4-hydroxypiperidine. | M.P. 146–148° C. |

EXAMPLE 2

3-methyl-4-phenyl-4-hydroxy-piperidine (a) 78.5 g. (0.5 mol) of 3-phenyl-$\Delta^{3,4}$-pentenonitrile (prepared by the condensation of propiophenone with cyanoacetic acid; b.p. 115° C./7 mm. Hg; it exclusively contains the $\beta,\gamma$-unsaturated nitrile) are dissolved in 200 ml. of methanol and, after the addition of 10 g. of Raney cobalt and 10 ml. of a 0.1 molar aqueous ferrous sulphate solution, are hydrogenated at 70° C. and at a pressure of 50 atmospheres of hydrogen until the absorption of hydrogen is completed, i.e. 19.7 litres of hydrogen within 1 hour. After cooling, the catalyst is filtered off with suction, the methanol evaporated from the solution in a vacuum and the residue distilled in a vacuum. Yield: 58.7 g. of 3-phenyl-$\Delta^{3,4}$-pentenylamine (73% of theory), b.p. 96–98° C./9 mm. Hg.

(b) 80.5 g. (0.5 mol) of the 3-phenyl-$\Delta^{3,4}$-pentenyl-amine are dissolved in 545 ml. of 1N hydrochloric acid, diluted with 2000 ml. of water and, after the addition of 50 g. of a 30% formalin solution, stirred for 40 hours at 80–90° C. The pH of the solution is 3.0; its concentration is about 0.2 molar. After cooling, the reaction mixture is rendered alkaline by the addition of a concentrated sodium hydroxide solution, the separated oil is taken up in about 3 litres of ether, separated and washed with a concentrated sodium chloride solution. After concentration of the ether solution to about 500 ml., crystallization starts.

1st crystallizate: 23.8 g., m.p. 126–142° C.

From the mother liquor after further concentration:

2nd crystallizate: 13.0 g., m.p. 118–121° C.

Residual mother liquor evaporated, residue distilled:

(a) b.p. 95–120° C./9 mm. Hg; 8.1 g. starting amine;
(b) b.p. 135–140° C./1.4 mm. Hg; 38.2 g.;

solidifies to a soft, crystalline mass.

Total yield: 75 g., i.e. 87.5% of theory, referred to the reacted amine.

The crystallizates are mixtures of the $\alpha$- and $\beta$-stereomers of 3-methyl-4-phenyl-4-hydroxy-piperidine, which can be separated by fractional crystallization from ether:

$\alpha$-compound: m.p. 125–126° C.; $\beta$-compound: m.p. 150–151° C.

$C_{12}H_{17}NO$ (191); (m.p. 150–151° C.)
Calc.: C 75.40, H 8.90, N 7.34
Found: C75.30, H 8.95, N 7.29

N-methyl derivative of the $\alpha$-compound: m.p. 78–80° C.

$C_{13}H_{19}NO$ (205)
Calc.: C 76.05, H 9.33, N 6.82
Found: C 76.15, H 9.36, N 7.08

When working is carried out in 1 molar solution by heating 16.1 g. (0.1 mol) of 3-phenyl-$\Delta^{3,4}$-pentenylamine, 16.2 ml. of 6.5 1N hydrochloric acid, 78 ml. of water and 11 g. of 30% formalin solution for about 50 hours, there are isolated:

(a) 4.2 g., m.p. 153° C.; $\beta$-3-methyl-4-phenyl-4-hydroxy-piperidine
(b) 8.2 g., b.p. 135° C./1.5 mm. Hg; solidifies with ether; mixture of the stereomers, besides 2.2 g. of starting amine.

Yield 75% of theory, referred to the reacted amine.

When the same reaction mixture is heated for only one hour, there are obtained:

(a) 2.8 g., m.p. 152–153° C.; $\beta$-compound
(b) b.p. 130° C./0.8 mm. Hg; 11.2 g.; crystallizes upon treatment with ether; in addition 2.3 g. starting amine. Yield 82.4% of theory, referred to the reacted amine.

When an analogous 0.1 mol reaction mixture is allowed to stand for 39 days at room temperature in a 0.1 molar solution (16.1 g. of 3-phenyl-$\Delta^{3,4}$-pentenylamine, 105 ml. of 1N hydrochloric acid, 10 g. of formalin solution, 900 ml.) there are obtained:

(a) 5.3 g., m.p. 122–125° C.; α-compound
(b) 7.0 g., m.p. 124° C./0.4 mm. Hg; solidifies with ether, in addition 1.2 g. starting amine.

Yield: 70.3% of theory, referred to the reacted amine.

EXAMPLE 3

3-methyl-4-(p-methoxyphenyl)-4-hydroxy-piperidine (a) 62 g. (0.331 mol) of 3-(p-methoxyphenyl)-$\Delta^{3,4}$-pentenonitrile (prepared from 4-methoxypropiophenone and cyanoacetic acid, b.p. 168–175° C./12 mm. Hg) in 500 ml. of methanol are mixed with 10 g. of Raney cobalt and 10 ml. of 0.1M ferrous sulphate solution and hydrogenated under pressure at 60–70° C. After separation of the catalyst, the solution is treated with active charcoal and concentrated in a vacuum. The residue is distributed between 200 ml. of 2N hydrochloric acid and benzene, the aqueous phase separated and rendered alkaline, while cooling, with a concentrated sodium hydroxide solution. The liberated amine is taken up in ether, the extracts dried over potassium carbonate and, after removal of the ether, the residue distilled at water jet pump pressure. The fraction distilling over between 148 and 154° C./12 mm. Hg consists of 3-(p-methoxyphenyl)-$\Delta^{3,4}$-pentenylamine.

(b) 59 g. (0.309 mol) of this 3-(p-methoxyphenyl)-$\Delta^{3,4}$-pentenylamine are dissolved in 265 ml. of 1.27N hydrochloric acid and 2700 ml. of water (pH 3.0–3.5) and mixed with 30.9 g. (0.309 mol) of 30% formalin solution. The reaction mixture is stirred for 78 hours at 80–90° C., the neutral parts are removed from the cooled reaction mixture with benzene, the aqueous-acidic solution is clarified with activated charcoal, covered with ether and, while cooling, rendered alkaline with an excess potassium carbonate solution. After separating the organic phase, extraction is carried out three times with ether, the combined extracts are dried over potassium carbonate and the ether is removed in a vacuum. The residue is recrystallized from ethyl acetate. Melting point of the 3-methyl-4-(p-methoxyphenyl)-4-hydroxy-piperidine: 138–141° C.; 15 g.

$C_{13}H_{19}NO_2$ (221.3)
Calc.: N 6.3
Found: N 6.42

After evaporation of the ethyl acetate mother liquor and distillation of the oily residue, there are obtained 10 g. of a crystallizing oil of b.p. 120–126° C./0.05 mm. Hg, which is a stereomer mixture.

EXAMPLE 4

N,3-dimethyl-4-phenyl-4-hydroxy-piperidine 52.8 g. (0.337 mol) of the 3-phenyl-$\Delta^{3,4}$-pentenylamine obtained according to Example 2(a) are dissolved in 345 ml. of 1N hydrochloric acid, diluted with 1050 ml. of water and, after the addition of 360 g. (3.6 mol) of 30% formalin solution, heated at 80–90° C. for about 18 hours; pH: 3–4. After cooling, the reaction mixture is rendered alkaline with a 50% potassium carbonate solution and the separated oily base taken up with ether. The residue of the ether solution is dissolved in 200 ml. of methanol, the solution mixed with 36.2 g. of formalin solution and 3.1 ml. of glacial acetic acid and, after the addition of 10 g. of Raney nickel, hydrogenated at 50–60° C. and 50 atmospheres pressure of hydrogen. When the hydrogen absorption is completed, the catalyst is separated, the methanol removed in a vacuum, the residue mixed with water and some potassium carbonate solution, the base taken up with ether and, after evaporation of the ether, distilled; the so obtained N,3-dimethyl-4-phenyl-4-hydroxy-piperidine boils at 125° C./1.5 mm. Hg to give a rapidly solidifying oil.

Yield 40 g., i.e. 58% of theory. After recrystallization from methyl-cyclohexane: m.p. 116–118° C. (β-compound).

$C_{13}H_{19}NO$ (205)
Calc.: N 6.82
Found: N 6.87

EXAMPLE 5

2-(p-methoxybenzyl)-4-isopropyl-4-hydroxy-piperidine (a) 177 g. (1.62 mol) of β-isopropyl-allyl cyanide (obtained by condensation of methyl isopropyl ketone with cyanoacetic acid; b.p 62–64° C./14 mm.Hg) are dissolved in 700 ml. of methanol and, after the addition of 20 g. of Raney cobalt and 20 ml. of ferrous sulphate solution, hydrogenated for 2 hours at 70° C. After cooling, the catalyst is filtered off with suction, the filtrate clarified with charcoal, filtered and the solvent distilled off at atmospheric pressure. The residue is distilled through a column, whereby the resultant mixture of 3-isopropyl-$\Delta^{3,4}$-butenyl-amine, 3,4-dimethyl-$\Delta^{3,4}$-pentenylamine and 3,4-dimethylpentylamine distills over as a colorless liquid at 142–146° C./760 mm. Hg.

(b) 100 g. (0.885 mol) of the mixture obtained according to (a) are dissolved in 840 ml. of 1.15N hydrochloric acid and 4 litres of water (pH 3–4). After the addition of 184 g. (0.863 mol) of p-methoxyphenyl-glycidic acid methyl ester, the mixture is stirred for 64 hours at 80° C. After allowing to cool, the aqueous acidic solution is decanted off from the smeary material adhering to the wall of the flask, treated with activated charcoal, filtered and rendered alkaline with excess potassium carbonate solution. After shaking out with ether several times, the extracts are dried over potassium carboante and concentrated in a vacuum. The 2-(p-methoxybenzyl)-4-isopropyl-4-hydroxy-piperidine thereby crystallizes out. After recrystallizing from acetone, the melting point is 140–142° C.

$C_{16}H_{25}NO_2$ (263.4)
Calc.: N 5.32, O 12.15
Found: N 5.31, O 12.16

When the p-methoxy-phenylglycidic acid methyl ester is replaced by an equimolar amount of benzaldehyde and the procedure is otherwise the same as that described under (b), there is obtained the 2-phenyl-4-isopropyl-4-hydroxy-piperidine of m.p. 138–140° C.

$C_{14}H_{21}NO$ (219)
Calc.: C 76.67, H 9.65, N 6.38
Found: C 76.75, H 9.52, N 6.35

EXAMPLE 6

2-(p-methoxybenzyl)-4-isobutyl-4-hydroxy-piperidine (a) 150 g. (1.2 mol) of a mixture of 3,5-dimethyl-$\Delta^{2,3}$-hexenonitrile, 3,5-dimethyl-$\Delta^{3,4}$-hexenonitrile and β - isobutylallyl cyanide (obtained by the condensation of methyl isobutyl ketone with cyanoacetic acid; b.p. 73–75° C./14 mm. Hg) are dissolved in 500 ml. of methanol, mixed with 15 g. of Raney colbalt and 15 ml. of 0.1M ferrous sulphate solution, and hydrogenated at 70–80° C. When the reaction mixture is cold, the catalyst is filtered off with suction, the filtrate decolorized with charcoal, the methanol removed at atmospheric pressure and the residue distilled in a vacuum. Boiling point of the amine mixture of 3,5-dimethyl-hexylamine, 3,5-dimethyl-$\Delta^{3,4}$-hexenylamine and 3-isobutyl-$\Delta^{3,4}$-butenylamine 53–58° C./15 mm. Hg.

(b) 80 g. (0.625 mol) of the amine mixture obtained according to (a), 520 ml. of 1.3N hydrochloric acid, 3 litres of water (pH of the solution 3–4) and 130 g. (0.625 mol) of p-methoxy-phenyl-glycidic acid methyl ester are stirred for 64 hours at 80° C. The cooled solution is decanted, treated with activated charcoal, filtered and rendered alkaline with excess potassium carbonate solution.

The liberated base is taken up in ether, the ethereal solution dried over potassium carbonate and evaporated in a vacuum. By vacuum distillation there is obtained from the residue the 2-(p-methoxybenzyl)-4-isobutyl-4-hydroxy-piperidine; b.p. 170–180° C./0.3 mm. Hg; m.p. 120–122° C.

$C_{17}H_{27}NO_2$ (277.4)
  Calc.: C 73.6, H 9.73, N 5.05
  Found: C 73.9, H 9.62, N 5.04

When, in the above Example, the p-methoxyphenylglycidic acid methyl ester is replaced by an equimolar amount of benzaldehyde and the procedure is otherwise the same as that described under (b), there is obtained the 2-phenyl-4-isobutyl-4-hydroxy-piperidine of m.p. 109–111° C.

$C_{15}H_{23}NO$ (233)
  Calc.: C 77.20, H 9.94, N 6.01
  Found: C 77.46, H 9.91, N 5.98

EXAMPLE 2

2-(p-methoxybenzyl)-3-phenyl - 4 - methyl - 4 - hydroxy-piperidine (a) 100 g. (0.636 mol) of a mixture of 3-methyl-4-phenyl - $\Delta^{2,3}$ - butenonitrile and 3-methyl-4-phenyl-$\Delta^{3,4}$-butenonitrile (obtained by condensation of phenyl-acetone with cyanoacetic acid; b.p. 143–146° C./14 mm. Hg) in 500 ml. of methanol, are, after the addition of 12 g. of Raney cobalt and 10 ml. of 0.1M ferrous sulphate solution, hydrogenated for 2 hours at 70° C. After removal of the catalyst, the methanol is distilled off in a vacuum and the residue distilled in a vacuum. The 3-methyl-4-phenyl-butenylamine boils between 126 and 136° C. at a pressure of 15 mm. Hg.

(b) A mixture of 84 g. (0.4 mol) of p-methoxyphenyl-glycidic acid methyl ester, 64.5 g. (0.4 mol) of 3-methyl-4-phenyl-butenylamine, 360 ml. of 1.2N hydrochloric acid and 2 litres of water (pH of the solution 3–4) is stirred for 84 hours at 80° C. The aqueous solution is decanted, treated with activated charcoal, filtered, rendered alkaline with a potassium carbonate solution and extracted several times with ether. The combined extracts are dried over potassium carbonate and evaporated in a vacuum. By vacuum distillation of the residue, there is obtained the 2-(p - methoxybenzyl)-3-phenyl-4-methyl-4-hydroxy - piperidine, b.p. 182–192° C./0.1 mm. Hg; m.p. 137–139° C.

$C_{20}H_{25}NO_2$ (311.4)
  Calc.: N, 450
  Found: N 4.69

EXAMPLE 8

2,3-dimethyl-4-phenyl-4-hydroxy-piperidine 80.5 g. (0.5 mol) of the 3-phenyl-$\Delta^{3,4}$-pentenylamine obtained according to Example 2(a) are dissolved in 525 ml. of 1N hydrochloric acid, diluted with 2000 ml. of water and, after the addition of 24.2 g. of freshly distilled acetaldehyde (0.55 mol), stirred for 40 hours at 80–90° C.; pH of the solution: 3–4. After cooling, the reaction mixture is rendered alkaline by the addition of a concentrated sodium hydroxide solution, the solution covered with ether and, after mixing at the separating layer, the reaction product separates in crystalline form. After standing, the crystals are filtered off with suction, washed with water and some ether and there is thus obtained a first crystallizate of 22.3 g.; m.p. 170–171° C. The residual lye is shaken out several times with ether, and from the combined ether extracts there are obtained an additional 3.8 g.; m.p. 169–171° C. After recrystallization from dilute methanol, the 2,3-dimethyl - 4 - phenyl - 4 - hydroxy-piperidine obtained has a m.p. of 172–173° C.

$C_{13}H_{19}NO$ (205)
  Calc.: C 76.05, H 9.33, N 6.82
  Found: C 76.00, H 9.36, N 6.78

Upon concentration of the ether solutions, an oil is obtained, which is fractionally distilled; besides 13.7 g. of starting base, there are obtained 35 g. of a viscous oil of b.p. 125–127° C./0.9 mm. Hg, which crystallizes upon trituration with a little ether. Yield: 71.8% of theory, referred to the reacted starting amine.

By the replacement of the acetaldehyde with an equimolar amount of freshly distilled benzaldehyde, there is obtained in analogous manner the compound 2,4-diphenyl-3-methyl-4-hydroxypiperidine of m.p. 123–126° C.

Example 9

N,3-dimethyl-4-phenyl-4-hydroxy-piperidine 34.9 g. (0.2 mol) of N-methyl-3-phenyl-$\Delta^{3,4}$-pentenyl-amine (produced by the N-methylation of the 3-phenyl-$\Delta^{3,4}$-pentenylamine obtained according to Example 2(a); b.p. 108–110° C./15 mm. Hg) are dissolved in 214 ml. of 1N hydrochloric acid, diluted with 780 ml. of water and, after the addition of 21.9 g. of 30% formalin solution, stirred for 40 hours at 80–90° C.; pH of the solution≈3.0. After cooling, the solution is rendered alkaline with sodium hydroxide solution, the base which separates is taken up with ether, separated and the ether evaporated. The solid residue obtained is recrystallized from methylcyclohexane, and thus 17.4 g. of the β-form of N,3-dimethyl-4 - phenyl - 4 - hydroxy-piperidine of m.p. 117–118° C. are obtained (cf. Example 4).

After evaporation of the solvent there is obtained from the methyl-cyclohexane mother liquor an oil from which, besides 2 g. of starting material, 10.4 g. of a stereometric mixture of b.p. 119–121° C./1.0 mm. Hg are obtained by distillation. From this mixture there can be separated, upon treatment with petroleum ether, a further 1.9 g. of the β-compound of m.p. 117–118° C. Yield 27.4 g. i.e. 71% of theory.

Content of the β-derivative in the stereomeric mixture: 70%.

EXAMPLE 10

2-isopropyl-3-methyl-4-phenyl-4-hydroxypiperidine 60.4 g. (0.375 mol) of 3-phenyl-$\Delta^{3,4}$-pentenylamine, produced according to Example 2(a), are dissolved in 1800 ml. of water by the addition of 60.7 ml. (0.395 mol) of 6.5N hydrochloric acid and, after the addition of 33 g. (0.458 mol) of freshly distilled isobutyraldehyde, heated at 80–90° C. for 144 hours. The pH of the solution is 3.0. After cooling and mixing with some ether, the clear solution obtained is rendered alkaline by the addition of a sodium hydroxide solution, and the reaction product then separates in crystalline form. After filtering off with suction, washing with water and some ether, a first crystallizate of 10.2 g., m.p. 156–157° C., is obtained. Upon evaporation of the ether solution and by shaking out the alkaline solution with ether, a second crystallizate of 2 g., m.p. 157° C., is obtained. By distillation of the residue of the ether solution, there is obtained, besides 27.2 g. of unreacted starting base, a stereomeric mixture (15.2 g.) boiling at 124–129° C./0.4 mm. Hg from which, by treatment with ether, a further 2.0 g. of the stereomer of m.p. 157° C. can be separated. Yield 27.4 g. of 2 - isopropyl-3-methyl-4-phenyl-4-hydroxy-piperidine, i.e. 56.8% of theory, referred to the reacted base. The reaction product consists of at least 51% of the stereomer of m.p. 157° C.

$C_{15}H_{23}NO$ (233); N: Calc. 6.01, found 6.18

N-methyl derivative m.p. 103–104° C.

$C_{16}H_{25}NO$ (247)
  Calc.: C 77.68, H 10.18, N 5.67
  Found: C 78.00, H 10.02, N 5.69

EXAMPLE 11

Diethylketone is condensed with cyano acetic acid, the obtained mixture of 90% 1 - cyano-2-ethyl-butene - (2), 10% 1 - cyano-2-ethylbutene-(1) $Kp_{14}$ 65–68° reduced similarly to Example 1(a) and the reaction product (consisting of 10% of 1-amino-3-ethyl-pentane, 10% 1-amino-3-ethyl-pentene-(2) and 80% 1-amino-3-ethyl-pentene-(3), Kp 152–154°) is reacted in the manner described under Example 1(b) with p-methoxyphenylglycidic acid methyl ester, thereby obtaining 2-p-methoxybenzyl - 3- methyl - 4 - ethyl-4-hydroxypiperidine of m.p. 112–115° and a mixture of the stereoisomeric form of this compound of $Kp_{0.15}$ 160–166°.

$C_{16}H_{25}NO_2$ (263.4)
  Calc.: C 72.8, H 9.48, N 5.32
  Found: C 72.4, H 9.44, N 5.44

EXAMPLE 12

Methyl-n-propylketone is condensed with cyano acetic acid, the obtained mixture of 1-cyano-2-methyl-pentene-(2), 1 - cyano-2-propyl-propene - (2) and 1-cyano-2-methyl-pentene-(1) $Kp_{14}$ 66–70° and reacted similarly to Example 1(a) and the reaction product (consisting of 70% of 1-amino-3-methyl-hexene-(3), 15% 1-amino-3-propyl-butene-(3) and 15% 1-amino-3-methylhexene-(2) Kp 148–152°) is reacted in the manner described under Example 1(b) with p-methoxyphenylglycidic acid methyl ester, thereby obtaining 2-p-methoxybenzyl-3 - ethyl-4-methyl-4-hydroxypiperidine of $Kp_{0.2}$ 160–168°.

$C_{16}H_{25}NO_2$ (263.4): Calc.: N 5.32, found: N 5.40

By replacing the p-methoxyphenylglycidic acid methyl ester with benzaldehyde there is obtained 2 - phenyl-3-ethyl-4-methyl-4-hydroxypiperidine, the hydrochloroide of which melts at 216–218°.

$C_{14}H_{22}ClNO$ (255.8)
  Calc.: C 65.7, H 8.60, N 5.47
  Found: C 65.9, H 8.81, N 5.22

EXAMPLE 13

1-Cyano-2,4-diphenyl-butene-(2) ($Kp_{0.1}$ 156–158°) obtained by the condensation of benzylacetophenone and cyano acetic acid is reduced similarly to Example 1(a) and the resulting 1 - amino-3,5 - diphenyl-pentene-(3) ($Kp_{0.2}$ 134–138°) is reacted in the manner described under Example 1(b) with formaldehyde, thereby obtaining 3 - benzyl - 4 - phenyl-4-hydroxypiperidine of m.p. 193–195°.

$C_{18}H_{21}NO$ (267.3): Calc.: N 5.23, found: N 5.08

EXAMPLE 14

Cyano acetic acid is condensed with 1-phenyl-pentene-(4)-one-(1) [$Kp_{0.1}$ 87–90° produced by the splitting off of the ketone from 2-allyl - 2 - benzoyl acetic acid ethyl ester ($Kp_{0.2}$ 118–119°)], the resulting 1-cyano-2-phenyl-hexadiene-(2,5) ($Kp_{0.1}$ 106–109°) reduced similarly to Example 1(a) with lithium aluminum hydride to 1-amino--3-phenyl-heptadiene - (3,6) ($Kp_{0.1}$ 95–97°) and this then reacted in the manner described under Example 1(b) with formaldehyde, thereby obtaining 3-allyl-4-phenyl-4-hydroxypiperidine of m.p. 141–143°.

$C_{14}H_{19}NO$ (217.3)
  Calc.: N 6.46, O 7.38
  Found: N 6.30, O 7.42

What is claimed is:
1. A compound of the formula:

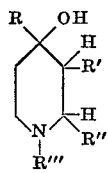

wherein
R is lower alkyl, phenyl or methoxyphenyl,
R' is lower alkenyl, phenyl or benzyl,
R" is hydrogen, lower alkyl, phenyl, nitrophenyl, mono- or di-lower alkoxy phenyl, halophenyl, lower alkoxy benzyl or pyridyl, and
R''' is hydrogen.

2. The compound according to claim 1 which is 2-p-methoxybenzyl-3,4-dimethyl-4-hydroxy-piperidine.
3. The compound according to claim 1 which is 2- phenyl-3,4-dimethyl-4-hydroxy-piperidine.
4. The compound according to claim 1 which is 2-isopropyl-3,4-dimethyl-4-hydroxy-piperidine.
5. The compound according to claim 1 which is 2-(p-methoxybenzyl)-4-isopropyl-4-hydroxy-piperidine.
6. The compound according to claim 1 which is 2-phenyl-4-isopropyl-4-hydroxy-piperidine.
7. The compound according to claim 1 which is 2-(p-methoxybenzyl)-4-isobutyl-4-hydroxy-piperidine.
8. The compound according to claim 1 which is 2-phenyl-4-isobutyl-4-hydroxy-piperidine.
9. The compound according to claim 1 which is 2-(p-methoxybenzyl)-3-phenyl-4-methyl-4-hydroxy-piperidine.
10. The compound according to claim 1 which is 2,4-diphenyl-3-methyl-4-hydroxy-piperidine.
11. The compound according to claim 1 which is 2-p-methoxybenzyl-3-methyl-4-ethyl-4-hydroxy-piperidine.
12. The compound according to claim 1 which is 2-p-methoxybenzyl-3-ethyl-4-methyl-4-hydroxy-piperidine.
13. The compound according to claim 1 which is 2-phenyl-3-ethyl-4-methyl-4-hydroxy-piperidine.
14. The compound according to claim 1 which is 3-benzyl-4-phenyl-4-hydroxy-piperidine.
15. The compound according to claim 1 which is 3-allyl-4-phenyl-4-hydroxy-piperidine.
16. A compound according to claim 1 wherein R is alkyl of 1 to 4 carbon atoms, phenyl or methoxyphenyl; R' is allyl, phenyl or benzyl; R" is hydrogen, alkyl of 1 to 3 carbon atoms, phenyl, nitrophenyl, methoxyphenyl, dimethoxyphenyl, chlorophenyl, methoxybenzyl or pyridyl; and R''' is hydrogen.
17. A compound of the formula

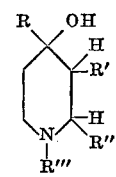

wherein
R is lower alkyl; R' is lower alkyl; R" is lower alkyl, phenyl or p-methoxybenzyl; and R''' is hydrogen.
18. A compound according to claim 17 wherein R is methyl and R' is methyl or ethyl.
19. A process for the production of a compound of claim 1 which comprises condensing a γ,Δ-unsaturated amine of the formula:

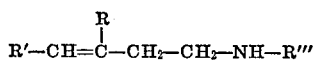

wherein R is lower alkyl, phenyl or methoxyphenyl; R' is lower alkenyl, phenyl or benzyl; and R''' is hydrogen, with an aldehyde of the formula R".CHO wherein R" is hydrogen, lower alkyl, phenyl, nitrophenyl, mono- or di-lower alkoxy phenyl, halophenyl, lower alkoxy benzyl or pyridyl, at a temperature of from room temperature to about 90°, in acidic solution at a pH of 2 to 4.
20. A process according to claim 19 wherein the condensation is carried out at an amine concentration of about 1 to 30%.

21. A process for the production of a compound of claim 25 which comprises condensing a γ,Δ-unsaturated amine of the formula:

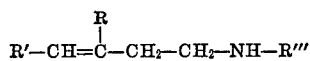

wherein R is lower alkyl; R' is lower alkyl; and R''' is hydrogen, wtih an aldehyde of the formula R''.CHO wherein R'' is lower alkyl, phenyl or p-methoxybenzyl, at a temperature of from room temperature to about 90° in acidic solution at a pH of 2 to 4.

22. A process according to claim 21 wherein the condensation is carried out in an amine concentration of about 1 to 30%.

References Cited

UNITED STATES PATENTS 3,158,616  11/1964  Adickes et al. ____ 260—294.3 A

FOREIGN PATENTS 960,895  6/1964  Great Britain _____ 260—294.7
1,078,286  8/1967  Great Britain _____ 260—239.3

OTHER REFERENCES

Ziering et al., "J. Organic Chemistry," vol. 22, pp. 1521–1528 (1957).

Berger et al., J. Org. Chem., vol. 12, pp. 904 to 910 (1947).

Randall et al., J. Pharmacol Exptl Therap 93, pp. 314 to 328 (1948).

House et al., J. Org. Chem., vol. 28, pp. 2407 to 2416 (1963).

Horowitz et al., J. Am. Chem. Soc., vol. 72, pp. 1518 to 1522 (1950).

Unkovskii et al., Chemical Abstracts, vol. 59, col. 7473 (1963).

Teotino, Chemical Abstracts, vol. 57, col. 11153 (1962).

JOHN D. RANDOLPH, Primary Examiner

U.S. Cl. X.R.

424—267; 260—293.52, 239.69, 293.81, 293.84, 293.9, 465 K, 465.1, 563 R, 578, 583 H